May 15, 1923.
J. T. TIGHE
CONDUCTOR CONNECTION
Filed Jan. 14, 1921
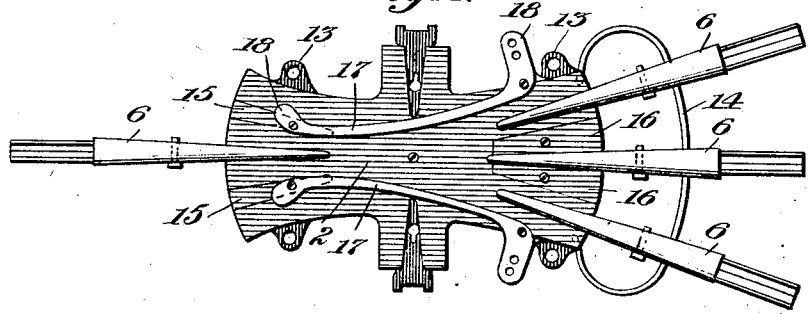
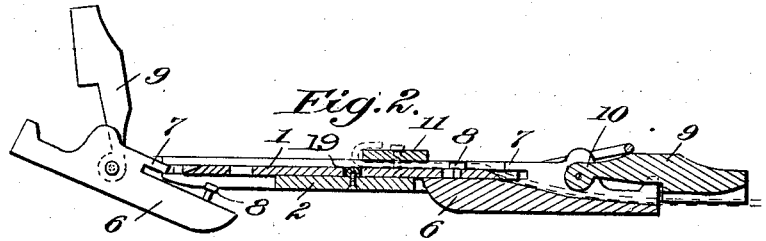
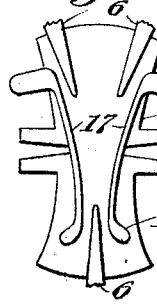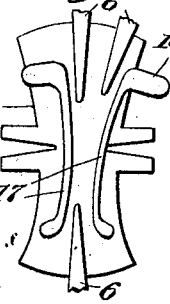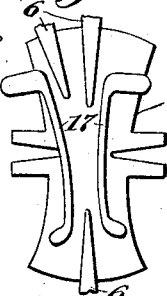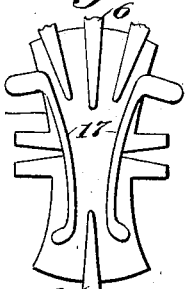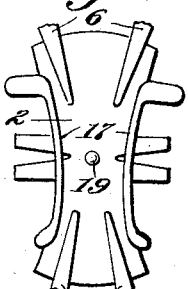
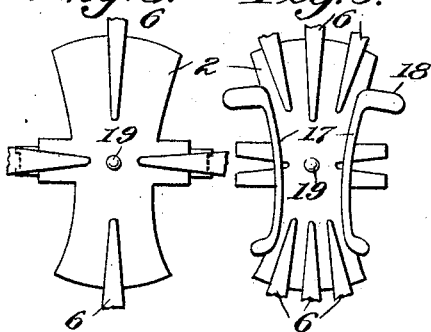
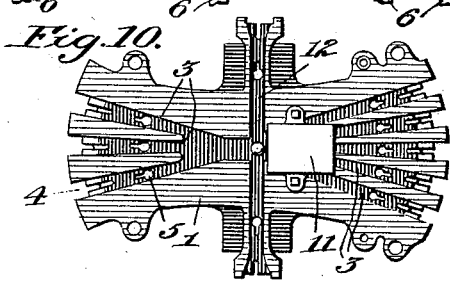
Inventor:
John T. Tighe,
by
Frank A. Kane, Atty.

Patented May 15, 1923.

1,455,415

UNITED STATES PATENT OFFICE.

JOHN T. TIGHE, OF SCRANTON, PENNSYLVANIA.

CONDUCTOR CONNECTION.

Application filed January 14, 1921. Serial No. 437,230.

*To all whom it may concern:*

Be it known that I, JOHN T. TIGHE, a citizen of the United States, and a resident of Scranton, Pennsylvania, have invented certain new and useful Improvements in a Conductor Connection, of which the following is a specification, reference being had therein to the accompanying drawing.

This invention comprises a conductor connection. It is customary, in present practice, to have a large number of connections for trolley wires, made up solidly in a number of ways to meet the requirements of right-hand, left-hand, straight-line, and various degrees of angulation switches, also cross-overs. Certain portions of these devices wear out more quickly than others and frequently the entire unit must be discarded when the renewal of a portion would suffice. The making of the devices as a unit, has other objectionable features among which are that the conductor wires must be loosened for even minor repairs, a large number of these connections must be carried in stock, thus tying up considerable capital, and it requires considerable time and skilled labor for installation.

It is contemplated among the objects of this invention to provide a device of this character, made up of standardized parts, interchangeable and so capable of arrangement that with one strain member and pan, all of the various angle switches, together with the right angle and adjustable angle cross-over may be produced by merely arranging the runners and other components in accordance with the use to which the device is to be put.

It is another object of the invention to make the body of the device in two parts, an upper one carrying the wire connections and a lower one acting as a pan and readily detachable from the upper portion to be replaced by another when certain portions are worn, this being effected without in any way interfering with the wire connections.

Still further objects are the provision of detachable runners which may be removed without loosening the wires; the provision of detachable approaching ears which may be removed without interference with either the runners or wires; the provision of adjustable wheel flange guides; the arrangement of certain wear plates on the surface of the pan which plates may be of a different quality from the body of the pan, wherein a guard is provided to prevent jamming of a trolley harp in the spaces between the runners; and in a word to provide a device of this character made up of interchangeable standardized parts detachably associated with a two-part body portion so that any degree of angle switch now generally used in this connection and both solid and adjustable crossovers may be produced by merely placing the runners and component parts in the positions corresponding to the use to which they are to be put.

Other objects and advantages will be in part apparent and in part be brought out more fully in the description.

A drawing is attached, illustrating an embodiment of the invention and wherein the following views are shown:

Fig. 1, is a view in bottom plan showing the device in use as a three way switch;

Fig. 2, is a view in central longitudinal section through Fig. 1, and showing the manner of attaching a runner;

Figs. 3 to 9, inclusive are views in bottom plan, illustrating different arrangements of parts to effect straight line, left-hand, right-hand, three-way, solid acute angle cross-over, right-angle cross-over, and six way switches respectively;

Fig. 10, is a view in top plan showing the upper portion of the switch and a wire clamp.

The conductor connection here shown comprises a body portion made up of an upper portion or plate 1 and a lower portion, plate, or "pan" 2, detachably connected as by bolts. On the upper surface of plate 1, as best seen in Fig. 10, there are a number of wire channels 3, spaced apart from each other and arranged to converge from opposite ends of the plate into larger channels at the center. The outer extremity of each of the smaller channels is spaced back slightly from the outer edge of the plate and has a tapered extremity 4, provided with a notch cut back therein thus leaving a slight ledge on each side of the groove. Between this and the centre of the plate, each groove is provided with an opening 5, having an elongated portion extending toward the outer edge of the plate. A runner 6 is adapted to be associated with the plate, its attachment and detachment being provided for as well as its locking. The runner carries spaced apart ears 7 adapted to be placed as shown at the left of Fig. 2, upon the ledges on the tapered portions 4 in the wire channels. When pushed to the extremity of its movement to the right a locking pin 8 is placed to come into apposition with the larger portion of opening 5, which is enlarged so as to allow the head of the pin to pass through. A slight movement of the runner to the left now draws the restricted neck of the locking pin into the slot, locking it in place but still leaving the ears 7 upon the ledges as shown at the right of Fig. 2.

Each of the runners is slotted or channeled for the passage of a trolley wire shown in dotted lines in Fig. 2, and associated therewith is an approaching ear and wire clamp 9. This member carries at its outer extremity a portion adapted to be bent around the trolley wire and at its inner end a cam 10. Through this there extends means for detachably securing it to the runner, as here shown a keyed slot extending through the cam and a key bearing in ears upstanding from the runner. There is also provided a second wire clamping member, here shown as a block 11 under which the terminals may extend and be bent back, the block being secured to the upper plate as by bolts. For the purpose of permitting the use of the plate as a right angle cross over, there are aligned wire slots 12 and means for connecting runners just as described, these being placed at opposite sides of the plate and at right angles to the centre wire slots. Eyes 13 are also provided for the purpose of engaging the cross wires to suspend the device when in use.

A guard 14 is provided to keep a trolley harp from jamming within the wedge-shaped space between the runners, the guard being supported suitably from the body of the connection.

The under portion, plate, or "pan" 2, is provided with slotted openings for the reception of the runners, the slots being shaped to correspond with the outer contour of the runner and serving to steady, secure, and brace these runners when the pan is connected to the upper portion. While the runners fit rather snugly in these slots the arrangement is such that the pan may be removed from the upper portion or plate 1 without removing the runners therefrom. The slots are slightly longer than the runner as shown to the right of Fig. 2. This leaves a small space between the end of the runner and the corresponding portion of the pan and facilitates removal of the pan without disturbing the runners. Slots in the pan which are not holding runners may be filled by a wedge 15, as shown in Fig. 1, and certain portions of the pan which are subjected to more wear than others may be provided with detachable portions 16, so constructed as to constitute an even, unbroken surface when assembled as shown in Fig. 1.

In conjunction with the pan, there are provided wheel flange guides 17. These upstand from the surface of the pan and have at either end lugs 18, one generally longer than the other and provided with a number of openings. These lugs serve to receive means for securing the guides to the pan or body, and the openings in the longer ear permit an adjustment of the guides with relation to the centre line of the pan. This adjustment of the guides is utilized to permit their use in the various types of connection shown in Figs. 3 to 9, inclusive, and the same bolts or the like which secure the wheel flange guides to the plate may be utilized to secure also the two plates together.

A second wheel guiding member or knob 19 is used in connection with the wider angle switches, crossovers and the like. This is ordinarily housed in an opening in the upper plate as shown in Fig. 2, when not in use and serves as an aid in securing the plates together. Placing the knob in the opening insures correct positioning of all the associated parts of both plates. Merely removing the securing means and reversing the knob as shown in Figs. 7, 8, and 9, brings it into use on the lower surface of the pan.

In the arrangement of the different forms of switches etc. shown in Figs. 3 to 9, it is customary to cut the plate or pan 2 with standard openings for the runners and any of these not being used are closed with one of the wedges 15.

From the foregoing it will be seen that the invention provides a conductor connection made in sections, one carrying the wires, the other aiding in securing and firmly holding the runners, all of the parts being detachable, the pan from the wire carrying portion without removal of the wires, and the runners also detachable and interchangeable. The arrangement of the wheel guide flanges and standardization of the parts, permits the use of the device in a large variety of places where it was heretofore necessary to carry a number of different style connections.

While the invention has been illustrated in the embodiment herein shown and described, I do not desire to limit myself to the precise form of this disclosure, as many changes may be made in the general construction and arrangement of these parts, without departing from the spirit of the invention or its scope as set forth in the claims.

What I claim is:—

1. A conductor connection comprising a body; a runner for a trolley wheel operatively associated with the body and upon which a trolley wheel is adapted to track, the runner being disposed between flanges on the wheel; a wheel flange guide operatively associated with the body and runner and adapted to engage an outer surface of a wheel flange, and means for adjusting the position of the wheel flange guide bodily in a lateral direction with relation to the body and runner.

2. The structure set forth in claim 1, wherein the means for adjusting the guide include an extension on the guide, provided with openings; and means, shiftable into different openings, for securing the guide in position.

3. A conductor connection comprising a plate; a trolley wheel runner associated with the plate and adapted to contact a trolley wheel between the flanges thereof; a guide associated with the plate and placed to contact with an outer surface of a flange of the wheel; and means for adjusting the position of a portion of the guide on the plate.

4. The structure set forth in claim 3, wherein the adjusting means include an extension on the guide provided with opening; and means, shiftable into different openings, for securing the guide in position.

5. A wear plate for conductor connections, having a portion of the plate including a section removable to constitute an opening for the reception of a runner.

6. A wear plate for conductor connections, having a portion of the plate including sections, one of which is removable to constitute an opening for the reception of a runner, said sections being shiftable to vary the placement of the runner with relation to the plate.

7. A wear plate for conductor connections, including sections; certain of said sections being removable to form an opening for the reception of a runner; and certain of said sections being shiftable to permit varying of the angle of placement of one runner with relation to another runner when the runners are operatively associated with the plate.

8. A conductor connection comprising a base; wheel runners associated therewith; a wear plate associated with the base and upon which a wheel is adapted to track in passing from one runner to another; said wear plate including sections, certain of which are removable to constitute a space for the reception of a runner; and means detachably securing the base and wear plate whereby the latter may be removed without disturbing a runner.

9. A conductor connection including a base; means for receiving and retaining a runner associated with the base, said means including a bayonet slot provided in the base; and a runner having coacting securing means including a projection on the runner adapted to interlock with the slot in the base to secure the runner to the base.

10. A conductor connection including a base; means for receiving and retaining a runner associated with the base, said means including a bayonet slot provided in the base; a runner having coacting securing means including a projection on the runner adapted to interlock with the slot in the base to secure the runner to the base; and means for locking the members in connected position, said means including a lip disposed on one of the members and adapted to coact with a portion of another member to lock the members against movement in one direction when assembled.

In testimony whereof I affix my signature.

JOHN T. TIGHE.